(12) United States Patent
Jeng et al.

(10) Patent No.: US 12,723,965 B2
(45) Date of Patent: Sep. 1, 2026

(54) SEEPAGE EROSION TEST SYSTEM

(71) Applicants: QINGDAO UNIVERSITY OF TECHNOLOGY, Qingdao (CN); CHANGSHA UNIVERSITY OF SCIENCE AND TECHNOLOGY, Changsha (CN); ZHEJIANG UNIVERSITY, Hangzhou (CN)

(72) Inventors: Dongsheng Jeng, Qingdao (CN); Hualing Zhai, Changsha (CN); Hongyi Zhao, Qingdao (CN); Yuhuan Zhang, Qingdao (CN); Lin Cui, Qingdao (CN); Zhen Guo, Hangzhou (CN); Junwei Liu, Qingdao (CN)

(73) Assignees: QINGDAO UNIVERSITY OF TECHNOLOGY, Qingdao (CN); CHANGSHA UNIVERSITY OF SCIENCE AND TECHNOLOGY, Changsha (CN); ZHEJIANG UNIVERSITY, Hangzhou (CN)

( * ) Notice: Subject to any disclaimer, the term of this patent is extended or adjusted under 35 U.S.C. 154(b) by 265 days.

(21) Appl. No.: 18/666,856

(22) Filed: May 17, 2024

(65) Prior Publication Data

US 2025/0290840 A1 Sep. 18, 2025

(30) Foreign Application Priority Data

Mar. 18, 2024 (CN) ......................... 202410305832.8

(51) Int. Cl.
*G01N 15/08* (2006.01)

(52) U.S. Cl.
CPC .................................. *G01N 15/082* (2013.01)

(58) Field of Classification Search
CPC .................................................... G01N 15/082
USPC ............................................................. 73/38
See application file for complete search history.

(56) References Cited

U.S. PATENT DOCUMENTS

2022/0236156 A1* 7/2022 Cai .................... G01N 15/0255
2022/0260475 A1* 8/2022 Huang ............... G01N 15/0806

FOREIGN PATENT DOCUMENTS

CN 208334084 U * 1/2019
CN 110940610 A * 3/2020 ............... G01N 5/04

* cited by examiner

*Primary Examiner* — Walter L Lindsay, Jr.
*Assistant Examiner* — Warren K Fenwick

(57) ABSTRACT

The present invention relates to a seepage erosion test system designed to evaluate soil erosion under controlled conditions. The system includes an acrylic rectangular pipe featuring a circular opening at its lower end. Attached to this is a soil sample pushing sub-device that encompasses a cylindrical sample tube, a piston, and four pore pressure gauges. The piston, which moves vertically within the tube. Additionally, the system incorporates a graduated cylinder pressurizing sub-device consisting of a graduated cylinder for water, a push plate, and a second pushing device for hydraulic pressurization. Water flow is regulated through a hose connected at one end to the piston and equipped with a valve for control. An air release valve and an air pressure sensor are also included for monitoring pressurization. The setup is completed with a three-way valve connected to the pipe, facilitating precise control of water flow and pressure during testing.

5 Claims, 5 Drawing Sheets

SEEPAGE EROSION TEST SYSTEM

TECHNICAL FIELD

The present application relates to the field of erosion test simulation technology, particularly involving a seepage erosion test system.

BACKGROUND

Erosion of soil by water flow is one of the most complex issues in geotechnical and hydraulic engineering. Most cases of riverbank collapse, instability of bridge piers and abutments, and breaches in embankments are caused by the loss of surrounding soil due to erosion.

The soil particles on the surface of the seabed/riverbed are primarily affected by the forces of water flow (shear stress, lift force), their own effective gravity, and the bonding forces between particles during erosion. The force exerted by water flow is the main driving force that causes the initiation, suspension, and erosion of soil particles. Effective gravity and the bonding forces between particles are inherent to the soil itself and provide the main resistance (i.e., erosion resistance) to keep the soil stationary and resist the transport by water flow. When the force exerted by water flow exceeds the erosion resistance of the soil, the soil particles will be transported and lost. If the soil is subjected to both erosion and seepage, the forces between soil particles and pore water pressure will undergo significant changes, affecting the erosion resistance of the soil and subsequently influencing the erosion process. Erosion and seepage often occur together in problems such as riverbank collapse, where the movement of soil particles due to water flow erosion under seepage conditions can cause deformations and collapse of the riverbank.

Therefore, many researchers at home and abroad have conducted numerous numerical simulations, field experiments, and laboratory experiments to study the problems of erosion and seepage. For example, Professor He Jianxin in China invented a test device for sediment initiation velocity under seepage force in early 2010. This device mainly studies the potential of sediment initiation under seepage force and can change the traditional method of relying on drag force of water flow to initiate sediment on the surface. It has important value, but the erosion trough of this device is not enclosed, and there are some deficiencies in the measurement of water flow velocity and other aspects. Jean-Louis Briaud invented an instrument called the Erosion Function Apparatus (EFA) in 1991 to determine the erosion characteristics of soil or rock. It accurately measures the relationship between erosion rate and shear stress of soil or rock under different water flow velocities, and finally obtains the critical shear stress or initiation velocity of the soil or rock. This instrument is precise and the experimental process is rigorous, but it does not consider the situation of seepage in the soil (or rock).

SUMMARY

The present specification provides an embodiment of a seepage erosion test system designed to simulate the erosion characteristics of soil samples under the combined action of various transverse water flows (steady flow and oscillating flow) and vertical seepage.

To address the aforementioned technical issues, the present embodiment of the specification is implemented as follows:

The present invention provides a seepage erosion test system, comprising:

An acrylic rectangular pipe, which is horizontally placed on a workbench, and the lower end of the acrylic rectangular pipe at the middle position is provided with a circular opening.

The soil sample pushing sub-device includes a cylindrical sample tube, a first pushing device, a piston, and four pore pressure gauges. The cylindrical sample tube is made of transparent acrylic material, and its diameter matches the opening size of the circular opening. The upper end of the cylindrical sample tube is inserted into the circular opening, and the upper end face of the cylindrical sample tube is flush with the inner end face of the lower end of the acrylic rectangular pipe. The piston is placed inside the cylindrical sample tube and is used to hold the soil sample. The internal diameter of the cylindrical sample tube is designed to match the size of the piston, and the first pushing device is used in conjunction with the lower end of the piston to allow the piston to move up and down inside the cylindrical sample tube. The four pore pressure gauges consist of the first, second, third, and fourth gauges. The first and second pore pressure gauges are placed on the upper end portion of the piston, while the third and fourth pore pressure gauges are fixed at the two ends of the top of the cylindrical sample tube.

The system further comprises a graduated cylinder pressurization sub-device, which includes a graduated cylinder, a push plate, and a second pushing device. The graduated cylinder is used to hold water for hydraulic pressurization. The bottom of the graduated cylinder has a first hose connection, which is a circular pipe connected to one end of a hose, with the other end of the hose inserted through the piston. The middle position of the hose is equipped with a first valve. The middle position of the graduated cylinder has a vent valve and a pressure sensor. The top of the graduated cylinder has a push plate, which is connected to the second pushing device. The second pushing device is used to drive the push plate to achieve a predetermined motion pattern.

One end of the acrylic rectangular pipe is connected to the first inlet of an electric three-way valve through a first variable diameter pipe. The second inlet of the electric three-way valve, which is opposite to the first inlet, is connected to an oscillating flow device. The third inlet of the electric three-way valve is connected to one end of an electric gate valve through a pipeline. The other end of the electric gate valve is connected to a centrifugal pump, and the pipeline connecting the centrifugal pump and the water tank is equipped with a second valve.

The other end of the acrylic rectangular pipe is connected to a second variable diameter pipe. The second variable diameter pipe is connected to the other end of the pipeline connected to the water tank. In this pipeline, a first flow sensor and a third valve are sequentially connected.

Preferably, the system also includes a camera, which is positioned at a predetermined distance before the connection between the acrylic rectangular pipe and the cylindrical sample tube. The camera is used to observe the erosion process of the soil sample during the experiment.

Preferably, a sediment filter is vertically placed at the middle position of the water tank, separating the water tank into a first section and a second section. The second section is located near a fourth valve, and a turbulence net is horizontally placed in the second section of the water tank.

Preferably, a filter net is placed on the upper end face of the piston to prevent the soil sample from blocking the hose or flowing into the interior of the graduated cylinder through the hose.

Preferably, a rubber buffer joint is installed at both ends of the centrifugal pump to absorb vibrations generated by the pump.

One embodiment of this specification can achieve the following beneficial effects: The test apparatus can be used to simulate the erosion characteristics of soil samples under the combined action of various transverse water flows (steady flow and oscillating flow) and vertical seepage. It also allows for the study of different types of soil samples (clay, silt, sand, etc.), water flow types (steady flow and oscillating flow), and the modification of seepage intensity, enabling experimentation under various conditions. It enables the investigation of particle mobilization in soil under the coupled effect of seepage and erosion, providing a qualitative understanding of seepage erosion mechanisms. Based on the experimental results, it is possible to establish a quantitative relationship between the critical erosion shear stress and the seepage gradient. This relationship can be used to modify sediment initiation formulas under the influence of seepage.

BRIEF DESCRIPTION OF THE DRAWINGS

In order to provide a clearer understanding of the embodiments or technical solutions described in this specification or prior art, the accompanying drawings used in the description of the embodiments or prior art will be briefly introduced below. It is understood that the drawings described below are merely some embodiments recorded in this application, and those skilled in the art can obtain other drawings based on these drawings without exercising inventive effort.

Figure 1:
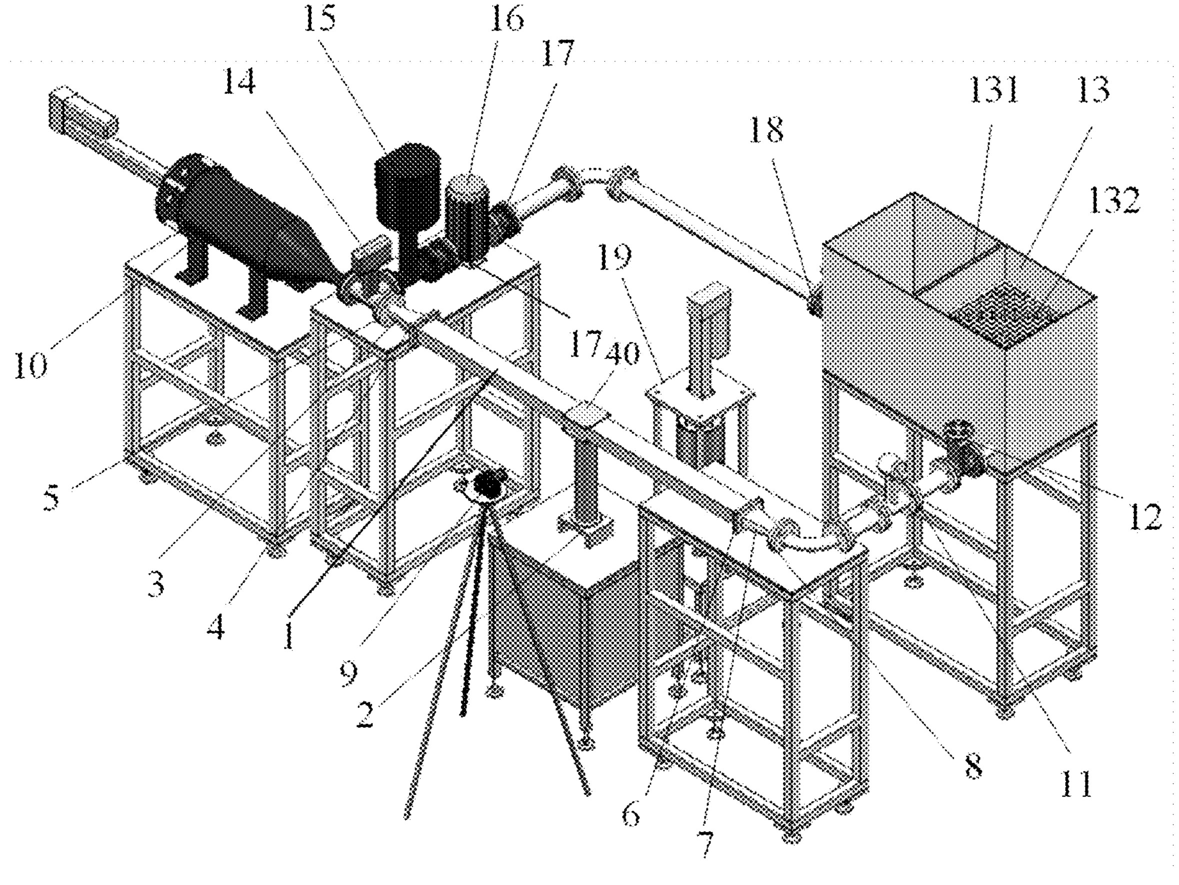
FIG. 1 is a schematic diagram illustrating the overall structure of a seepage erosion test system provided in an embodiment of the present invention.

In the above description, 1 represents an acrylic rectangular pipe, 2 represents a soil pushing sub-device, 3 represents a first variable diameter pipe, 4 represents a first flange, 5 represents a second flange, 6 represents a third flange, 7 represents a second variable diameter pipe, 8 represents a fourth flange, 9 represents a camera, 10 represents an oscillating flow device, 11 represents a first flow sensor, 12 represents a fourth valve, 13 represents a water tank, 131 represents a sediment filter, 132 represents a turbulence net in the water tank, 14 represents an electric three-way valve, 15 represents an electric gate valve, 16 represents a centrifugal pump, 17 represents a rubber buffer joint, 18 represents a second valve, 19 represents a pressure device for a graduated cylinder, 20 represents a first flow meter, 21 represents a second flow meter, 22 represents a support, 23 represents a third valve, 24 represents a fifth valve, 25 represents a pore pressure gauge, 26 represents a soil sample, 27 represents a connection point of the first hose, 28 represents a sample tube, 29 represents an observation area, 30 represents a vent valve, 31 represents a pressure sensor, 32 represents a connection point of the second hose, 33 represents a graduated cylinder, 34 represents a piston, 35 represents a first pushing device, 36 represents a push plate, 37 represents a hose, 38 represents a first valve, 39 represents a second pushing device, 40 represents a cover plate.

DETAILED DESCRIPTION OF PREFERRED EMBODIMENTS

In order to make the purpose, technical solutions, and advantages of one or more embodiments of this specification clearer, the specific embodiments of this specification and the corresponding drawings will be used to describe the technical solutions of one or more embodiments of this specification clearly and completely. It is apparent that the described embodiments are only a part of the embodiments of this specification, not all of them. Based on the embodiments disclosed in this specification, all other embodiments obtained by those skilled in the art without exercising inventive effort are within the scope of protection of one or more embodiments of this specification.

It should be understood that although terms such as "first," "second," "third," etc., may be used to describe various information in this application, these terms should not be limited to their literal meaning. These terms are used only to distinguish one type of information from another.

The present invention provides a seepage erosion test system that simulates the scouring action of water flow while applying a vertical seepage action to the soil. It studies the erosion characteristics of soil or rock under seepage conditions and establishes the qualitative relationship between the basic properties of the soil or rock sample, the seepage gradient (seepage force), and the water flow velocity. It investigates the initiation of soil particles under seepage and scouring, which is important for understanding the mechanism of soil subjected to coupled seepage and scouring effects. This experimental device is used to simulate the scouring characteristics of soil under various lateral water flows (steady flow and oscillating flow) and vertical seepage. The experiments can also vary the types of soil samples (clay, silt, sand, etc.), water flow characteristics, and the intensity of seepage, allowing for testing under various conditions. It can study the initiation of soil particles under coupled seepage and scouring effects, qualitatively understand the seepage scouring mechanism, establish a quantitative relationship between the critical erosion shear stress and the seepage gradient, and modify sediment initiation formulas under seepage conditions.

The following is a description of the structure and deformation structure of the seepage erosion test system provided by the present invention, in conjunction with the accompanying drawings.

Figure 4:
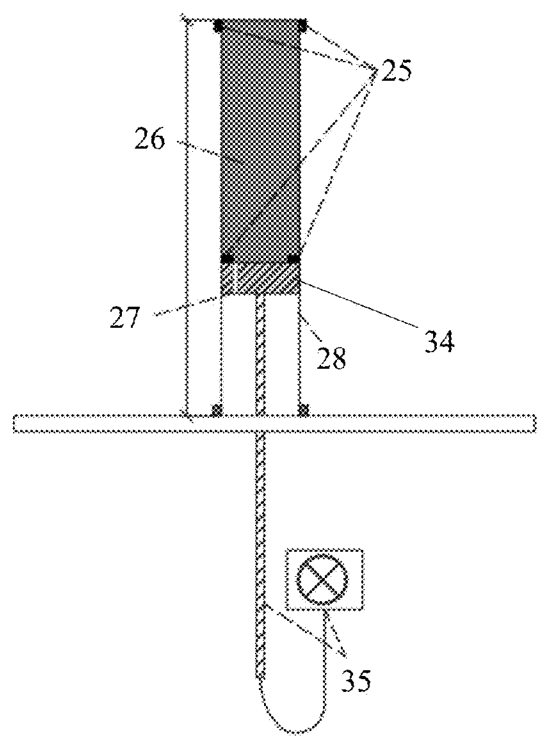
FIG. 4 is a schematic diagram of a soil pushing device in a seepage erosion test system provided in an embodiment of the present invention.

FIG. 1 is a schematic diagram of the overall structure of a seepage erosion test system according to an embodiment of the present invention. As shown in FIG. 1, the seepage erosion test system may include an acrylic rectangular pipe 1. The acrylic rectangular pipe 1 is horizontally placed on a workbench and can have dimensions of 1676 mm×100 mm×50 mm (length×width×height) (inner diameter) as shown in FIG. 1. It is centrally symmetrical and fixed on the workbench along the observation area. The acrylic rectangular pipe 1 is made of transparent acrylic material and is sealed and impermeable. The lower end of the middle position of the acrylic rectangular pipe 1 is provided with a circular opening for connecting to the sample tube in the soil pushing sub-device 2. The seepage erosion test system also includes a soil pushing sub-device 2. FIG. 4 shows a schematic diagram of the structure of the soil pushing sub-device 2. As shown in FIG. 4, the soil pushing device 2 may include a cylindrical sample tube 28, a first pushing device 35 (which can optionally use a motor), a piston 34, and four pore pressure gauges 25. The transparent acrylic material is used for the cylindrical sample tube 28. The diameter of the cylindrical sample tube 28 matches the size of the circular opening. The upper end of the cylindrical sample tube 28 is clamped inside the circular opening of the acrylic rectangular pipe 1, and the upper end face of the cylindrical sample tube 28 is flush with the inner end face of the lower end of the middle position of the acrylic rectangular pipe 1. The piston 34 is placed inside the cylindrical sample tube 28 and is used to bear the soil sample. The size of the piston 34 matches the inner diameter of the cylindrical sample tube 28. The first pushing device 35 is matched with the lower end of the piston 34, allowing the piston 34 to move up and down inside the cylindrical sample tube 28. As shown in FIG. 4, the four pore pressure gauges can include a first pore pressure gauge, a second pore pressure gauge, a third pore pressure gauge, and a fourth pore pressure gauge. The first and second pore pressure gauges are placed at the upper end of the piston 34, while the third and fourth pore pressure gauges are fixed at the two ends of the top of the cylindrical sample tube 28.

Figure 6:
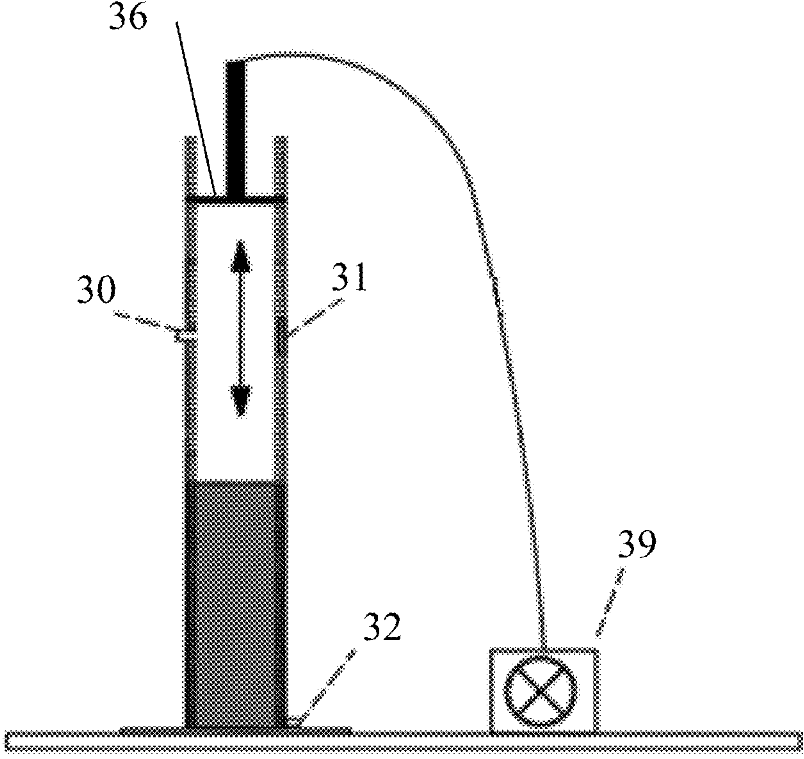
FIG. 6 is a schematic diagram of a pressure device for a graduated cylinder in a seepage erosion test system provided in an embodiment of the present invention.
Figure 7:
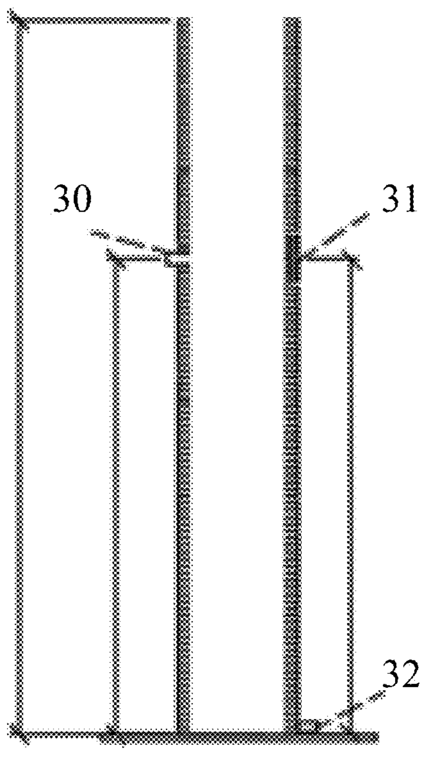
FIG. 7 is a schematic diagram of the structure of a graduated cylinder in a pressure device of a seepage erosion test system provided in an embodiment of the present invention.

The system further includes a graduated cylinder pressurizing sub-device 19. FIG. 6 shows a schematic diagram of the graduated cylinder pressurizing device 19. As shown in FIG. 6, the graduated cylinder pressurizing device 19 includes a graduated cylinder 33, a push plate 36, and a second pushing device 37. The graduated cylinder 33 is used to hold water for hydraulic pressurization. FIG. 7 is a structural schematic diagram of the graduated cylinder in the graduated cylinder pressurizing device 19 of the seepage erosion test system according to an embodiment of the present invention. As shown in FIG. 7, the bottom of the graduated cylinder 33 is provided with a hose connection 32. The hose connection 32 is a circular tube that is connected to one end of a hose 37. The other end of the hose 37 penetrates and inserts into the piston 34. The middle position of the hose 37 is equipped with a first valve 38. The middle position of the graduated cylinder is equipped with a vent valve 30 and an air pressure sensor 31. The air pressure sensor 31 is used to monitor and record the real-time air pressure inside the graduated cylinder 33. The top of the graduated cylinder 33 is equipped with a push plate 36, which is connected to the second pushing device. The second pushing device is used to drive the push plate 36 to achieve a predetermined motion form.

Below, the structure of the soil pushing sub-device 2 will be described in conjunction with the accompanying drawings, as shown in FIG. 4. The soil pushing sub-device 2 includes a sample tube 28. In an optional technical solution, the inner diameter of the sample tube 28 is 76 mm, with a height of 450 mm, and it is made of stainless steel material. The soil pushing sub-device 2 also comprises a first pushing device 35, which is used to push the piston 34 to move the soil inside the sample tube 28 up and down. When the soil inside the sample tube 28 reaches the same level as the rectangular cross-section pipe (i.e., the acrylic rectangular pipe 1 in FIG. 1), when pushing the soil upward, it is necessary to precisely and rapidly push the soil at a fixed height of 1 mm. After waiting for this 1 mm of soil to be washed away by water, another 1 mm of soil is pushed upward. Therefore, it is required that the first pushing device 35 achieves precise and rapid pushing when pushing the soil upward after reaching the level of the soil and the sample tube 28. The soil pushing sub-device 2 also includes a piston 34. In an optional technical solution, the diameter of the piston 34 is 76 mm, with a perforated bottom and connected to the hose 37. It is required to have a tight connection at the connection between the sample tube 28 and the hose 37 to prevent water leakage. Among the four pore pressure gauges in the soil pushing sub-device 2, two pore pressure gauges are installed at the top of the sample tube 28 to measure the pore pressure at the top of the soil sample. Two additional pore pressure gauges are installed above the piston 34 to measure the pore pressure at the bottom of the soil sample and calibrate the seepage force.

Figure 3:
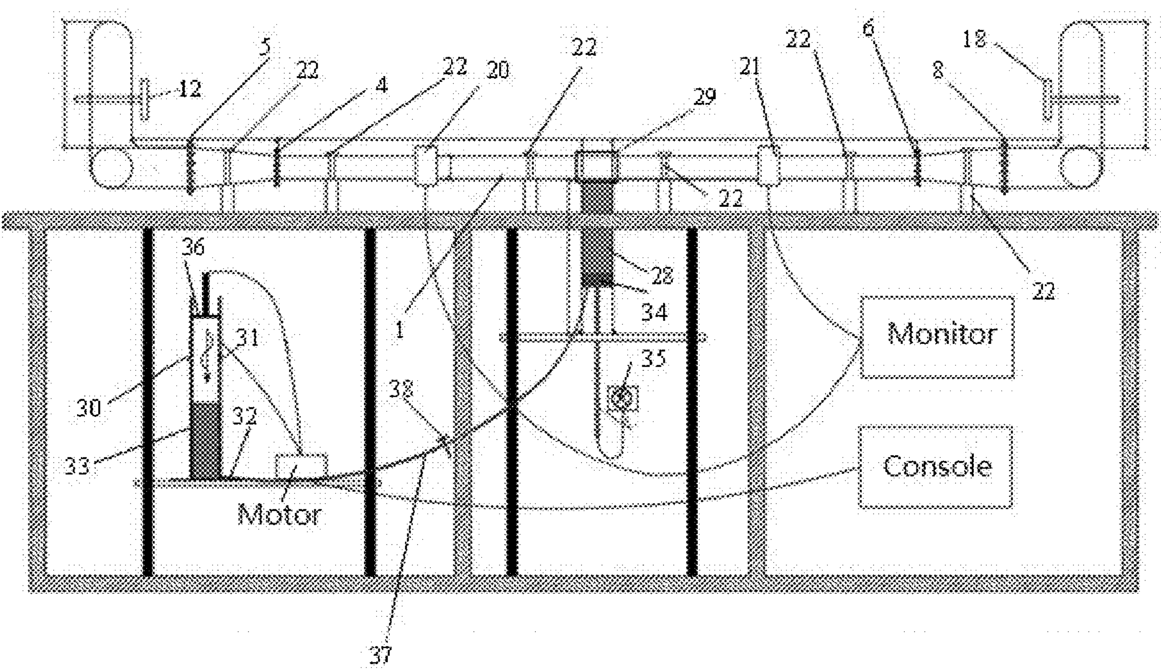
FIG. 3 is a front view of a seepage erosion test system corresponding to FIG. 2 provided in an embodiment of the present invention.

Now, let's explain the structure of the pressure sub-device 19 for the graduated cylinder, as shown in FIG. 6. FIG. 6 is a schematic diagram of the structure of the pressure device for the graduated cylinder in a seepage erosion test system provided in an embodiment of the present invention. The pressure device for the graduated cylinder includes one graduated cylinder (referred to as cylinder 33 in FIG. 3). In an optional embodiment, the diameter of the cylinder 33 is 100 mm, with a height of 600 mm, and it is made of transparent acrylic material. The bottom of the cylinder 33 is connected to a hose 37 at the opening (referred to as hose connection 32 in FIG. 7). On the left side, at a distance of 400 mm from the bottom, there is a vent valve (referred to as vent valve 30 in FIG. 7) used to adjust the water level inside the cylinder 33 by venting. The vent valve requires a very low gas discharge rate. At the same distance of 400 mm from the bottom, on the right side, there is an air pressure sensor 31 used to accurately measure the changes in air pressure inside the cylinder 33. It is required that the vent valve 30 of the cylinder 33 is well sealed, and there should be no exchange of gas between the inside and outside when the vent valve 30 is closed. Similarly, the hose connection 32 should also be well sealed and impermeable to water and air.

By adjusting the position of the push plate 36, which moves up and down through the second pushing device 39, the pressure inside the graduated cylinder 33 is regulated to induce upward or downward movement of water flow within the soil. It is required that the pressurizing device maintains a constant pressure inside the graduated cylinder 33 after pressurization. represent the initial pressure value inside the graduated cylinder 33 when the water level remains unchanged during the flow of fluid within the soil. The range of variation for the initial pressure value is 100-110 kPa. Additionally, the range of variation for the added pressure value is set at (−10 kPa) to (10 kPa). Negative values indicate that the pressure plate rises, resulting in a decrease in the internal pressure of the graduated cylinder 33, while positive values indicate that the pressure plate descends, causing an increase in the internal pressure of the graduated cylinder. It is required that the connection between the pressure plate and the graduated cylinder 33 is in a sealed state, preventing the exchange of gas between the inside and outside of the system.

One end of the acrylic rectangular tube 1 is connected to the first inlet of the electric three-way valve 14 through the first reducer tube 3. The electric three-way valve 14 is used to select the type of fluid (such as constant flow or oscillating flow). The second inlet of the electric three-way valve 14, opposite to the first inlet, is connected to the oscillating flow device 10. The third inlet of the electric three-way valve 14 is connected to one end of the electric gate valve 15 through a pipeline. The electric gate valve 15 is used to control the flow rate of constant flow, with a range of =0.01 m/s to 0.6 m/s. The other end of the electric gate valve 15 is connected to a centrifugal pump 16, which provides the constant flow. In the pipeline connecting the centrifugal pump 16 and the water tank 13, a second valve 18 is installed. A buffer rubber joint 17 is placed at each end of the centrifugal pump 16 to absorb the vibration and prevent the vibration of the centrifugal pump from affecting the pipeline. As shown in FIG. 1, symbol 17 represents the buffer rubber joint at one end of the centrifugal pump 16.

The other end of the acrylic rectangular tube 1 is connected to the second reducer tube 7. In the pipeline connecting the second reducer tube 7 and the other end of the water tank 13, there are sequentially connected the first flow sensor 11 and the third valve 23.

The system also includes a camera 9, which is positioned at a predetermined distance before the connection between the acrylic rectangular tube 1 and the cylindrical sample tube. The camera 9 is used to observe the erosion process of the soil during the experiment. In the middle of the water tank 13, there is a vertical mud and sand filter screen 131, which separates the water tank 13 into the first and second parts. The second part is located near the fourth valve 12 and has a horizontal turbulence screen 132. The upper end face of the piston 34 is equipped with a filter screen to prevent soil samples from clogging the hose 37 or flowing into the interior of the graduated cylinder 33 through the hose 37.

In an optional technical solution, at the upper end position corresponding to the circular opening at the lower end of the acrylic rectangular tube 1, a rectangular opening can be created. This rectangular opening can be used for inserting soil samples into the sample tube. Specifically, as shown in FIG. 1, the cover plate 40 is provided, and the lower part of the cover plate 40 corresponds to the rectangular opening. The cover plate 40 is used to cover the rectangular opening and can be detachably fixed on the acrylic rectangular tube 1 by screws.

In the optional technical solution, the oscillating flow device 10 provides oscillating flow through the movement of the push plate, and the variation satisfies the equation: u=u0 cos $f_0(wt+\varphi)$. The range of values for u0 is set at 0.1 m/s to 0.6 m/s. The oscillating flow has a range of oscillation period T from 10 s to 80 s. To simulate one cycle of the oscillating flow, it needs to be divided into 80 small segments. Therefore, the frequency range of the water pump is 1 Hz-8 Hz.

In the optional technical solution, the water tank 13 is divided into two parts using the mud and sand filter screen 131. The water tank turbulence screen 132 is placed in the middle of the right side of the water tank 13. The sand-laden water flow enters the water tank 13 from the right side and is subjected to turbulence reduction through the water tank turbulence screen 132. The mud and sand are filtered out by the mud and sand filter screen 131, ensuring that the water on the left side of the water tank 13 remains stable and free of mud and sand.

Figure 2:
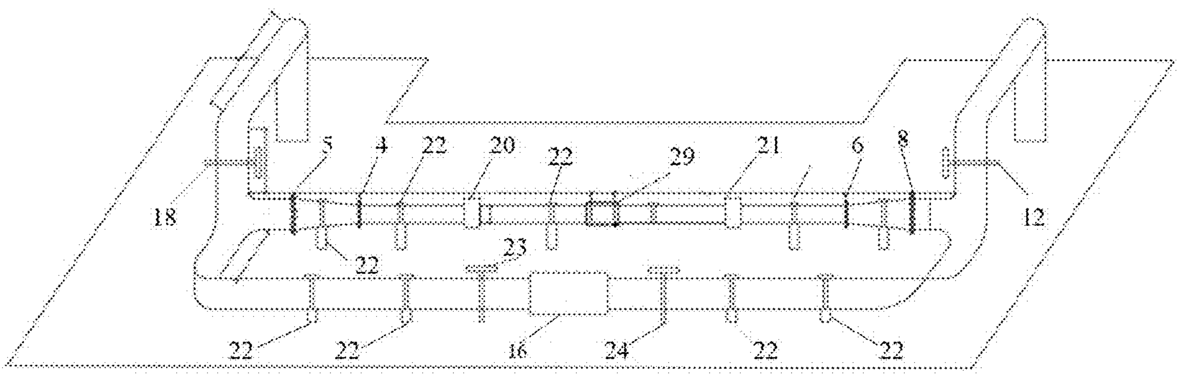
FIG. 2 is a simplified schematic diagram illustrating another structure of the seepage erosion test system relative to FIG. 1 provided in an embodiment of the present invention.
Figure 5:
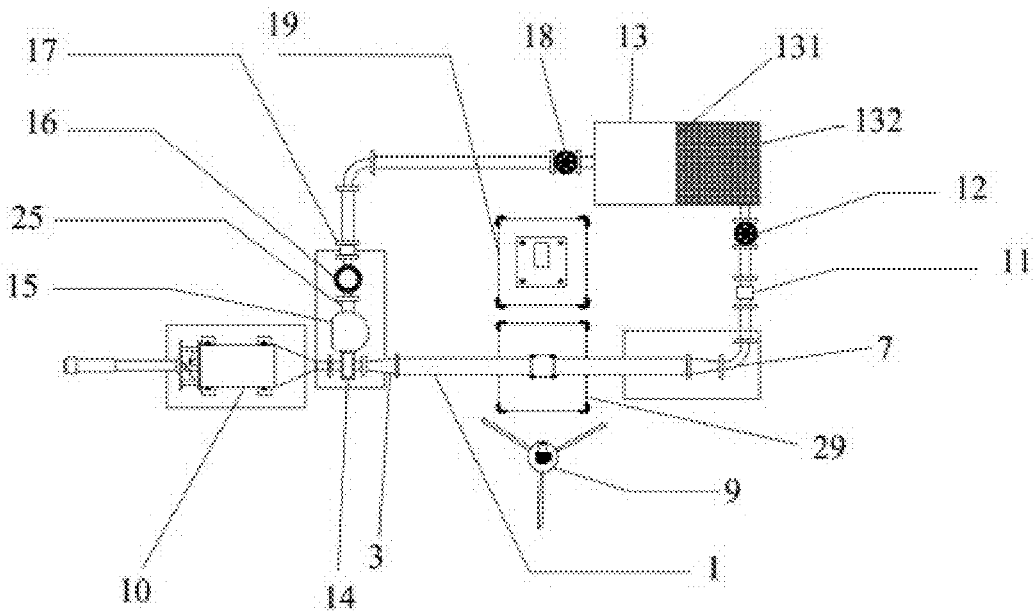
FIG. 5 is a configuration diagram of a water circulation device in a seepage erosion test system provided in an embodiment of the present invention.

As shown in FIG. 2, which is a schematic diagram illustrating another structure of a seepage erosion test system relative to FIG. 1 in an embodiment of the present invention. In the apparatus of FIG. 2, there are two valves, namely the third valve 23 and the fifth valve 24, on the left and right sides of the centrifugal pump 16, respectively, which are used to control the flow direction of the fluid output by the centrifugal pump 16. There are two valves (namely the fourth valve 12 and the second valve 18) at the outlet of the pipeline, which are used to control the location of water discharge. For example, when the third valve 23 on the left side of the centrifugal pump (as shown in FIG. 5) is open, the flow direction of water flowing through the rectangular pipeline (i.e., the acrylic rectangular tube 1) is from left to right with a positive flow rate. At this time, the valve (i.e., the fourth valve 12) at the outlet on the right side is open (while the second valve 18 needs to be closed), allowing water to flow out from the outlet on the right side into the water reservoir. If the fifth valve 24 on the right side of the centrifugal pump 16 (as shown in FIG. 5) is open, the flow direction of water flowing through the rectangular pipeline is from right to left with a negative flow rate. At this time, the second valve 18 at the outlet on the left side is open, allowing water to flow out from the outlet on the left side. There is a valve (i.e., the first valve 38) at the connection between the graduated cylinder 33 and the sample tube 28, which is used to control whether water in the graduated cylinder 33 is connected to the soil sample. If the influence of vertical seepage on erosion is to be studied, the first valve 38 is opened. If the influence of seepage is not considered, the first valve 38 is closed.

Experimental Steps:

Before conducting the experiment, it is necessary to perform basic property tests on the soil sample to obtain fundamental parameters such as permeability coefficient K, density ρ, and water content ω.

To prepare the sample, the soil sample is placed into the sample tube through the top position of the acrylic tube 1. As mentioned earlier, a rectangular opening can be created at the upper end position corresponding to the circular opening at the lower end of the acrylic rectangular tube 1. This rectangular opening is equipped with a cover plate 40. When it is necessary to place the soil sample into the sample tube, the cover plate 40 can be opened, and the soil sample can be inserted into the sample tube through the rectangular opening. The amount of soil sample to be placed can be determined based on experimental requirements.

After placing the soil sample, the valves are opened, and the water pump is started until the flow fills the rectangular cross-section of the tube. Then, the water pump is turned off, and the system is left to settle until the soil inside the sample tube reaches a saturated state. At this point, the free water surface inside the pressure device of the graduated cylinder remains fixed.

The experiment begins by opening the valves and starting the water pump while observing the flow state through the glass window until the flow fills the rectangular cross-section of the tube. The valves are adjusted to achieve the desired flow rate, and the flow rate Q1 is recorded. The high-speed camera is then turned on to monitor the entire process. The handwheel is turned until the pressure gauge pointer reaches the desired value, and the handwheel is stopped, and the pressure value P is recorded. The water seepage in the soil sample is observed from the soil sampler. When the water flow is about to seep to the top of the soil sample, the handwheel is turned to push the soil sample upwards. The rise of the soil sample is observed through the glass window until it reaches the desired height, and the height H of the soil sample is recorded. The timer is started at this point, and the time to is recorded.

The experiment is considered complete when the top of the soil sample is observed to be roughly level with the bottom of the rectangular cross-section of the tube through the glass window. At this point, the timer is stopped, and the time t1 is recorded.

The steps (4) and (5) are repeated continuously, and the time required for each erosion of the soil sample at the same height is recorded. Finally, the water pump, valves, and valves are closed, and the experiment is terminated. The initial shear stress of the soil can be calculated based on the recorded erosion time and flow rate.

During the test, the water flow velocity value V and the water head pressure P value can be changed, and finally you can get:

When the flow velocity V remains constant, the relationship curve between the erosion rate Z and the permeability coefficient K for different hydraulic head pressures P can be observed. The permeability coefficient K of the soil sample is constant. If the hydraulic head pressure P increases, the upward seepage force acting on the soil also increases, resulting in a corresponding decrease in the resistance of the soil particles to erosion. The change in the erosion rate Z under these conditions can be compared to the situation without seepage.

When the hydraulic head pressure P remains constant, the relationship curve between the erosion rate Z and the flow velocity V or shear stress $\tau$ can be obtained to determine the critical flow velocity Vcr or critical shear stress $\tau$cr. The Z-V or Z-$\tau$ curves obtained under seepage conditions can be compared with the Z-V or Z-$\tau$ curves previously obtained by Jean-Louis Briaud using EFA to analyze the erosion mechanism of the soil under seepage conditions.

Keeping the flow velocity V and hydraulic head pressure P constant, the experiment involves varying the permeability coefficient K by testing different soil samples to obtain the seepage and erosion characteristics of different soils. This aims to analyze and validate the coupled mechanisms of seepage and erosion in different soil types.

The oscillatory flow device utilizes a paddle wave generation method to simulate oscillatory flow. Initially, the basic parameters of the oscillatory flow are provided to the water pump to generate the desired oscillatory flow. When the flow velocity of the oscillatory flow is positive, the paddle inside the oscillatory flow device moves to the right according to a predetermined motion pattern. This causes the fluid within the device to flow from left to right over the top of the sample tube and exit through the outlet pipe into the reservoir. Conversely, when the flow velocity of the oscillatory flow is negative, the paddle inside the oscillatory flow device moves to the left according to a predetermined motion pattern. This facilitates the flow of fluid from the reservoir, flowing from right to left over the top of the sample tube and eventually returning to the oscillatory flow device.

In this experiment, it is necessary to maintain a fixed internal pressure in the graduated cylinder ($p=p_0+p_1$). To achieve a constant value, the volume of air inside the graduated cylinder needs to be adjusted. Therefore, by moving the pressurizing plate up or down by a fixed height, the pressure of the internal air within the graduated cylinder can be increased or decreased, thus enabling the upward or downward flow of pore water within the soil. The initial position of the pressurizing plate is set around 500 mm above the bottom of the graduated cylinder, near the middle section of the cylinder.

To ensure the sealability of the sample tube, the piston is integrated with the sample tube, preventing it from being pulled out of the tube. Therefore, the soil must be introduced into the sample tube from the top. The soil is then pushed upward using the first pushing device until it reaches the surface for experimentation. At the beginning of the experiment, the soil sample needs to be pushed away from the top of the sample tube by 1 mm and then allowed to be washed away by the flowing water. The time required for the soil to be washed away by 1 mm in height is recorded. This process is repeated in cycles. Therefore, the first pushing device needs to accurately push the soil sample upward by a height of 1 mm. This requires the first pushing device to be easy to operate, take a short amount of time, and have precise pushing distance. Therefore, a pushing accuracy of 0.1 mm is required. At the top of the sample tube, a pore pressure gauge is installed to measure the changes in pore pressure on the soil surface. The connection between the bottom hose and the sample tube needs to be well sealed and leak-proof. Additionally, a filter screen is installed on the upper part of the piston to prevent soil from flowing into the graduated cylinder through the hose. By measuring the time it takes for the soil to be washed away at a fixed height, the shear stress and erosion rate on the soil surface can be calculated. This allows for the determination of the critical erosion shear stress and the quantitative relationship between the critical erosion shear stress and seepage gradient. It also helps in correcting the sediment initiation formula under seepage conditions.

The test apparatus can be used to simulate the erosion characteristics of soil samples under the combined action of various transverse water flows (steady flow and oscillating flow) and vertical seepage. It also allows for the study of different types of soil samples (clay, silt, sand, etc.), water flow types (steady flow and oscillating flow), and the modification of seepage intensity, enabling experimentation under various conditions. It enables the investigation of particle mobilization in soil under the coupled effect of seepage and erosion, providing a qualitative understanding of seepage erosion mechanisms. Based on the experimental results, it is possible to establish a quantitative relationship between the critical erosion shear stress and the seepage gradient. This relationship can be used to modify sediment initiation formulas under the influence of seepage.

Professionals in this field can understand that the accompanying diagram is merely an illustrative example and the modules or processes depicted in the diagram may not necessarily be essential for implementing the invention.

Professionals in this field can understand that the modules in the device described in the example can be distributed within the device as described in the example or can be placed in one or more devices different from this example. The modules mentioned in the example can be combined into one module or further divided into multiple sub-modules.

It should be noted that the above embodiments are provided for the purpose of illustrating the technical solution of the present invention, rather than limiting it. Although detailed descriptions have been provided with reference to the aforementioned embodiments, professionals in the field should understand that modifications can still be made to the technical solutions described in the embodiments or equivalent substitutions can be made to some technical features. These modifications or substitutions do not depart from the essence and scope of the technical solutions of the embodiments of the present invention.

What is claimed is:

1. A seepage erosion test system, characterized by comprising:

an acrylic rectangular pipe (1), wherein the acrylic rectangular pipe (1) is horizontally placed on a workbench, and a circular opening is provided at a lower end of a middle position of the acrylic rectangular pipe (1);

a soil sample pushing sub-device (2), comprising:

a cylindrical sample tube made of transparent acrylic material, wherein its diameter is sized to match the circular opening of the acrylic rectangular pipe (1), and the cylindrical sample tube is clamped at its upper end into the circular opening, aligning an inner end face of the upper end of the cylindrical sample tube with the lower end of the middle position of the acrylic rectangular pipe (1);

a piston (34) positioned inside the cylindrical sample tube to support a soil sample, wherein an internal diameter of the cylindrical sample tube and a size of the piston (34) are matched;

a first pushing device coupled with a lower end of the piston (34) to facilitate a vertical movement of the piston (34) inside the cylindrical sample tube; and four pore pressure gauges positioned as follows: the first and second pore pressure gauges are located at an upper end of the piston (34), while the third and fourth pore pressure gauges are fixedly arranged at two ends of a top of the cylindrical sample tube;

a graduated cylinder pressurizing subsystem (19), comprising:

a graduated cylinder (33) for holding water, with a first hose connection (27) at its bottom configured as a circular pipe connecting one end of a hose (37), wherein the other end of the hose (37) passes through and inserts into the piston (34), and a first valve (38) is positioned at a middle of the hose;

an air release valve and an air pressure sensor positioned at a middle of the graduated cylinder (33); and a push plate (36) at a top of the graduated cylinder (33), connected to a second pushing device (39) designed to drive the push plate (36) to achieve a predetermined motion form;

an interconnection of the acrylic rectangular pipe (1) to a water flow and pressure control system, comprising:

a first inlet of an electric three-way valve (14) connected to one end of the acrylic rectangular pipe (1) through a first reducer (3), wherein a second inlet of the electric three-way valve (14) is connected to an oscillating flow device (10) opposite the first inlet, and a third inlet of the electric three-way valve (14) is connected to one end of an electric gate valve (15) through a pipeline, and the other end of the electric gate valve (15) is connected to a centrifugal pump (16);

a pipeline connecting the centrifugal pump (16) and one end of a water tank (13) equipped with a second valve (18); and a connection from the other end of the acrylic rectangular pipe (1) to a second reducer (7), and a pipeline connecting this second reducer (7) and the other end of the water tank (13), sequentially connected to a first flow sensor (11) and a third valve (23).

2. The seepage erosion test system of claim 1, further comprising:

a camera (9) positioned at a predetermined distance in front of a clamping point where the acrylic rectangular pipe (1) and the cylindrical sample tube meet, wherein the camera (9) is configured to observe and record an erosion process of the soil sample during the test.

3. The seepage erosion test system of claim 1, further comprising:

a sediment filter (131) vertically installed at a middle position of the water tank (13), wherein the sediment filter (131) divides the water tank (13) into a first part and a second part, the second part being proximate to a fourth valve (12); and a tank turbulence net (132) horizontally positioned within the second part of the water tank (13), designed to facilitate distribution and management of sediment during testing.

4. The seepage erosion test system of claim 1, further comprising:

a filter screen located at an upper end surface of the piston (34), designed to prevent soil particles from entering and potentially blocking the hose (37) or migrating into an interior of the graduated cylinder (33) through the hose (37).

5. The seepage erosion test system of claim 1, further comprising:

buffer rubber joints (17) installed at each end of the centrifugal pump (16), where these buffer rubber joints (17) are used to absorb vibrations generated by the centrifugal pump (16) during operation.

* * * * *